United States Patent [19]
Griot

[11] 3,859,355
[45] Jan. 7, 1975

[54] 1-P-(ω)-AMINOALKOXY)PHENYL-3,5-DIARYL-CYCLOHEPTANES

[75] Inventor: Rudolf G. Griot, Riehen, Basel-Stadt, Switzerland

[73] Assignee: Sandoz, Inc., Hanover, New Jersey

[22] Filed: Apr. 9, 1969

[21] Appl. No.: 814,822

[52] U.S. Cl. ... 260/570.7, 260/293.8, 260/326.5 M, 260/501.18, 260/501.19, 260/590, 424/267, 424/274, 424/316, 424/330

[51] Int. Cl. ........................................... C07c 93/06

[58] Field of Search....... 260/570.7, 501.18, 501.19, 260/293.3, 326.5 M

[56] References Cited
UNITED STATES PATENTS

| | | | |
|---|---|---|---|
| 3,299,139 | 1/1967 | Pedersen | 260/570.8 |
| 3,472,896 | 10/1969 | Seki et al. | 260/570.7 |
| 3,576,877 | 4/1971 | Albert et al. | 260/570.9 X |

OTHER PUBLICATIONS

Burger, "Medical Chemistry," 2nd Ed., pages 82–83, (1960).
Protwer et al., "Jour. Med. Chem.," Vol. 4, No. 2, pages 411–415, (1961).

*Primary Examiner*—Robert V. Hines
*Attorney, Agent, or Firm*—Gerald D. Sharkin; Richard E. Vila

[57] ABSTRACT

Disclosed are 1-p-(ω-aminoalkoxy)phenyl-3,5-diaryl-cycloheptanes useful as hypolipidemic agents, and intermediates useful in the preparation of said compounds including the corresponding cycloheptan-1-ols.

16 Claims, No Drawings

1-P-(ω-AMINOALKOXY)PHENYL-3,5-DIARYL-CYCLOHEPTANES

This invention relates to 1-p-(ω-aminoalkoxy)phenyl-1,2-diaryl-cycloheptanes. The invention also relates to pharmaceutical compositions and methods utilizing said compounds, and, to intermediates useful in the preparation of said cycloheptanes.

In accordance with the present invention there is provided cycloheptane derivatives from the group of:

A. Compounds of the following formula I:

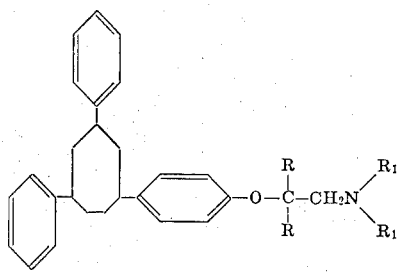

wherein
- each of R is, independently, hydrogen or lower alkyl of one to four carbon atoms, e.g., methyl; and
- each of $R_1$ is, independently, lower alkyl of one to four carbon atoms, e.g., methyl and ethyl, or both $R_1$ together form an alkylene bridge of four to five carbon atoms, e.g., both $R_1$ together with the amino nitrogen form a N-pyrrolidyl substituent; and B. an N-oxide of said compounds;

or a pharmaceutically acceptable acid addition salt of (A) and (B), above.

The compounds of formula I are preferably prepared by catalytic hydrogenation of a corresponding cycloheptan-1-ol of the formula IIA or of a corresponding cycloheptene of the formula IIB, as follows:

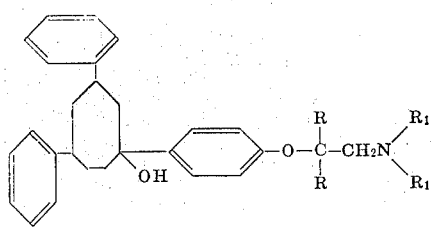

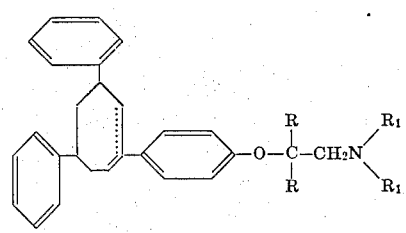

wherein R and $R_1$ are as defined.

The preparation of compounds I from a compound of formula IIA or IIB involves a catalytic hydrogenation which may be carried out over a fairly wide temperature range typically from 10° C. to 100° C., preferably between 20° C. to 80° C. The hydrogenation may be carried out at atmospheric pressure or a superatmospheric pressure, and usually in the range between atmospheric pressure up to 2,000 p.s.i. The hydrogenation is conducted preferably with an approximately required stoichiometric amount of elemental hydrogen and in the presence of inert organic solvent and hydrogenation catalyst of which several are known and available, such as platinum supported on carbon or palladium on carbon. The especially preferred catalyst is palladium supported on carbon, e.g., a catalyst of a minor portion of 3–10% palladium on 90–97% charcoal. Such charcoal supported palladium catalysts are of a well-known type. The especially preferred solvent for use with palladium-carbon catalyst is acetic acid. Compounds I are conveniently recovered in the form of an acid addition salt, preferably the hydrochloride, and, if desired, may be converted to the free base by conventional procedures.

The preparation of compounds IIB may be accomplished by subjecting a compound IIA to dehydration in a known manner such as by contacting a compound IIA with a strong inorganic acid such as hydrochloric acid. As will be evident the compounds IIB are readily formed by removal of a pendant hydroxy group resulting in the introduction of a double bond as indicated in formula IIB. The exact positioning of such double bond is not known and therefore may alternately be located as indicated by the dotted line in said formula IIB. The compounds of formula IIB may be isolated from the dehydration reaction by working up by conventional procedures.

The preparation of the N-oxide of the compounds of formula I may be carried out by the established peroxide procedures, for example, by reaction of a compound I with a peroxide such as a peracid, e.g., perbenzoic acid, m-chloroperbenzoic acid or peracetic acid with or without a solvent, e.g., chloroform, as may be desired or required depending respectively upon the selection of liquid or solid oxidizing agents, at temperatures between room temperature up to about 90° C. The production of N-oxides is preferably carried out with a peroxide by established procedures, for example, by reaction of a compound I with hydrogen peroxide in a suitable solvent at temperatures between room temperature up to about 90°C. Examples of preferred organic solvents typically employed include ethanol, acetic acid and acetic anhydride. The N-oxide may be isolated from the reaction mixture by working up by established procedures.

The compounds of formula IIA are novel compounds and are preferably prepared by reacting a 3,5-diaryl-cycloheptanone formula III:

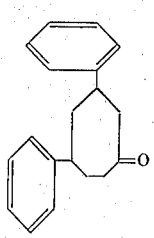

with a Grignard compound of formula IV:

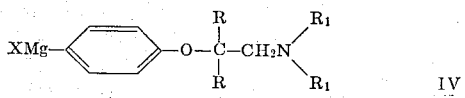

wherein R and $R_1$ are as defined and X is halo of atomic weight of from 35 to 127, followed by hydrolysis in a known manner to obtain said compounds of formula IIA.

As illustrated above, compounds IIA are preferably produced by the reaction of a compound III with an appropriate Grignard compound IV. The reaction of a compound III with the Grignard compound IV to produce compounds IIA is carried out in a conventional manner in the presence of an inert organic solvent and preferably at temperatures between about −10° C. to +80° C., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and other ethers such as diethyl ether, more preferably tetrahydrofuran. The compounds IIA may be isolated from the reaction mixture by working up by established procedures.

It will be evident that compounds of formula IIB may be also obtained more directly by following the above-described Grignard reaction by acid hydrolysis, for example with sulfuric acid, and then working up in a conventional manner to obtain said compounds IIB.

The compounds III and IV employed as starting material in preparation of compounds IIA are either known or can be prepared from known materials by established procedures, for example, by reaction of 3,5-diphenylcyclohexanone with diazomethane which is desirably provided in situ by a material forming diazomethane, e.g., p-tolysulfonylmethylnitrosamide in the presence of an alkali metal hydroxide, in an inert medium at temperatures between 0° C. to 80° C., preferably 10° C. to 30° C. Of interest with reference to such preparation of compounds III is Org. Synth., Col. Vol. IV, pg. 225. The Grignard compounds of formula IV are most conveniently prepared by reaction of magnesium with the corresponding 4-halo-1-aminoalkoxybenzene and the latter compounds conveniently prepared by reaction of a p-halophenol with the alpha halo derivative of or forming the desired ω-aminoalkoxy moiety and having the following formula V:

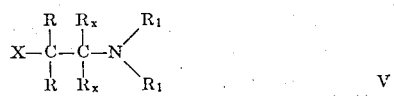

wherein R, $R_1$ and X are as defined, and both $R_x$ are both hydrogen or lower alkyl but when lower alkyl both R are hydrogen.

It will thus be evident that the reaction of the appropriate p-halophenol starting material with a compound V involves a synthesis of the known Williamson type. The compounds IV in which R is lower alkyl are desirably prepared from compounds V in which $R_x$ is lower alkyl because such compounds V readily undergo rearrangement on reaction with phenol starting material (phenolate) to form compounds IV in which the alpha carbon substituent R is lower alkyl, as described by J. F. Kerwin et al., J.A.C.S. 69, 2961 (1947).

Also within the scope of the present invention are pharmaceutically acceptable salts not materially affecting the pharmacological effect of the compounds of the invention. Such salts include the acid addition salts, e.g., the hydrochloride, fumarate, formate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural formulae I and their N-oxides and pharmaceutically acceptable acid addition salts are useful because they possess pharmacological activity in animals. In particular, the compounds are useful as hypolipidemic agents, as evidenced, for example, by having hypocholesteremic activity, as indicated by tests on a group of white rats which are given typically 10–50 milligrams per kilogram of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964) : (Technicon method N 24a) : and Kessler, G. and Lederer, H. Technicon Symposium, Mediad Inc., New York, pages 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milligram to about 50 milligrams per kilogram of animal body weight, preferably given in divided doses, two to four times a day, or in sustained release form. For most mammals the total daily dosage is from about 50 milligrams to about 500 milligrams of the compound and the dosage forms suitable for internal use comprise from about 12.5 milligrams to about 250 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetenting agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient | Weight (mg.) |
| --- | --- |
| 1-[4-(1,1-Dimethyl-2-dimethylaminoethoxy) phenyl]-3,5-diphenyl-cycloheptane hydrochloride | 50 |
| Tragacanth | 10 |
| Lactose | 197.5 |
| Corn Starch | 25 |
| Talcum | 15 |
| Magnesium stearate | 2.5 |

The following examples are for purposes of illustration only.

EXAMPLE 1

1-[4-(2-Diethylaminoethoxy)phenyl]-3,5-diphenyl-cycloheptane hydrochloride.

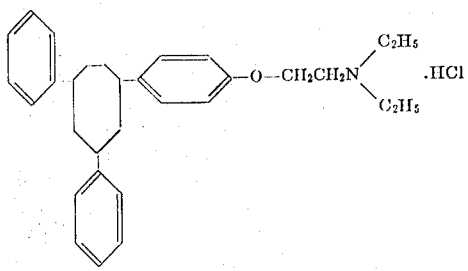

STEP A: Preparation of 3,5-diphenylcycloheptanone.

A mixture of 25 g. of 3,5-diphenylcyclohexanone, 24.6 g. of p-tolysulfonylmethylnitrosamide and 300 ml. of 95% ethanol is cooled to 0° C. and there is slowly added dropwise with rapid stirring a solution of 3 g. of potassium hydroxide in 10 ml. of 50% ethanol. The rate of addition is controlled to maintain temperature of the mixture between 10°C. to 20° C. and after addition and evolution of nitrogen the resulting mixture is allowed to stand with stirring for 30 minutes. The resulting mixture is concentrated in vacuo and the residue treated with 2N. hydrochloric acid followed by extraction three times each with 100 ml. of diethyl ether. The resulting crude oil is subjected twice to column chromatography over silica gel with benzene to obtain a purified oil of 3,5-diphenyl-cycloheptanone.

STEP B: Preparation of 1-[4-(2-diethylaminoethoxy)pheny]-3,5-diphenyl-cycloheptan-1-ol.

A solution of 16 g. of p-bromo-diethylaminoethoxy-benzene in 32 ml. of tetrahydrofuran is added dropwise to 1.56 g. of magnesium turnings in 16 ml. of refluxing tetrahydrofuran under a dry nitrogen atmosphere, followed by refluxing for an additional one hour. To the resulting mixture is added a solution of 6.5 g. of 3,5-diphenylcycloheptanone in 32 ml. of tetrahydrofuran followed by refluxing for 3 hours and stirring overnight at room temperature. The resulting mixture is treated by addition of saturated ammonium chloride solution, and then extracted twice with diethyl ether. The ether lagers are combined, washed neutral with water, dried, filtered and warmed under reduced pressure to remove solvent and obtain an oil of 1-[4-(2-diethylaminoethoxy)pheny]-3,5-diphenyl-cyclohept an-1-ol which is readily dehydrated by hydrochloric acid to obtain a corresponding cycloheptene.

STEP C: Preparation of 1-[4-(2-diethylaminoethoxy)pheny]-3,5-diphenyl-cycloheptane hydrochloride.

A solution of 6.4 g. of 1-[4-(2-diethylaminoethoxy)pheny]-3,5-diphenyl-cyclohept an-1-ol in 75 ml. of glacial acetic acid is hydrogenated over 0.6 g. of 5% palladium on charcoal under pressure of 1,500 psi. at temperatures of 65°–70° C. until the hydrogen uptake is about stoichiometric. The resulting mixture is filtered, concentrated in vacuo and the residue taken up in 2N. sodium hydroxide solution followed by extraction three times each with 150 ml. of diethyl ether. The ether layers are washed neutral with water, dried, and concentrated in vacuo to obtain a crude oil which in purified by column chromatography using silica gel and chloroform/benzene (1:1). The purified material is dissolved in diethyl ether and treated with an excess of hydrogen chloride saturated ether. The ether is decanted, the solid material triturated several times with ether and crystallized from a minimum of warm isopropanol to obtain 1-[4-(2-diethylaminoethoxy)pheny]-3,5-diphenyl-cycloheptane hydrochloride, m.p. 105° C. (dec.).

A similar result is obtained when following essentially the procedure of Step C, above, and employing as starting material the corresponding cycloheptene obtained on dehydration in Step B, above.

EXAMPLE 2

Following the general procedure of Example 1 and employing the appropriate starting materials in approximately similar proportions there is obtained the compound 1-[4-(1,1-dimethyl-2-dimethylaminoethoxy)pheny]-3,5-diphenyl-cycloheptane hydrochloride.

What is claimed is:

1. A compound from the group of (A) compounds of the formula:

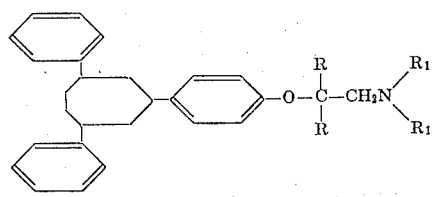

wherein
    each of R is, independently, hydrogen or lower alkyl; and each of $R_1$ is, independently, lower alkyl, or both $R_1$ together form an alkylene bridge of four to five carbon atoms; and B. an N-oxide of said compounds;

or a pharmaceutically acceptable acid addition salt of (A) and (B), above.

2. A compound according to claim 1 having the formula:

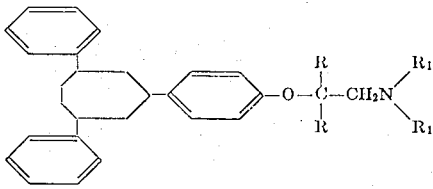

wherein R and $R_1$ are as defined in claim 1.

3. A compound of claim 2 in which $R_1$ is lower alkyl of one or two carbon atoms.

4. The compound of claim 3 which is 1-[4-(2-diethylaminoethoxy)phenyl]-3,5-diphenyl-cycloheptane.

5. A compound of claim 3 in which R is hydrogen.

6. A compound of claim 3 in which R is lower alkyl of 1 or 2 carbon atoms.

7. A compound of claim 6 in which R is methyl.

8. The compound of claim 7 which is 1-[4-(1,1-dimethyl-2-dimethylaminoethoxy)phenyl]-3,5-diphenyl-cycloheptane.

9. A compound of claim 1 which is an N-oxide.

10. An N-oxide of a compound of claim 5.

11. The N-oxide of the compound of claim 4.

12. An N-oxide of a compound of claim 6.

13. An N-oxide of a compound of claim 7.

14. The N-oxide of the compound of claim 8.

15. A compound of the formula:

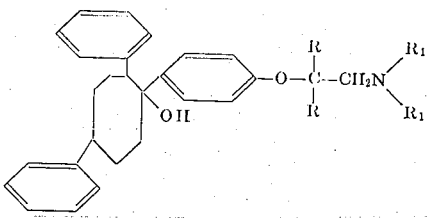

wherein
each of R is, independently, hydrogen or lower alkyl; and
each of $R_1$ is, independently, lower alkyl, or both $R_1$ together form an alkylene bridge of four to five carbon atoms;

16. A compound of claim 15 in which $R_1$ is lower alkyl of one or two carbon atoms and each R is lower alkyl of one or two carbon atoms.

* * * * *